(12) United States Patent
Kim et al.

(10) Patent No.: US 11,476,500 B2
(45) Date of Patent: Oct. 18, 2022

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Hyun Seung Kim, Daejeon (KR); Chul Haeng Lee, Daejeon (KR); Sung Hoon Yu, Daejeon (KR); Hyun Yeong Lee, Daejeon (KR)

(73) Assignee: LG Energy Solution, Ltd.

( * ) Notice: Subject to any disclaimer, the term of this patent is extended or adjusted under 35 U.S.C. 154(b) by 435 days.

(21) Appl. No.: 16/635,405

(22) PCT Filed: Feb. 12, 2019

(86) PCT No.: PCT/KR2019/001705
§ 371 (c)(1),
(2) Date: Jan. 30, 2020

(87) PCT Pub. No.: WO2019/156539
PCT Pub. Date: Aug. 15, 2019

(65) Prior Publication Data
US 2021/0036364 A1 Feb. 4, 2021

(30) Foreign Application Priority Data
Feb. 12, 2018 (KR) .................. 10-2018-0016782

(51) Int. Cl.
*H01M 10/0567* (2010.01)
*H01M 10/0525* (2010.01)
*H01M 10/0569* (2010.01)

(52) U.S. Cl.
CPC ... *H01M 10/0567* (2013.01); *H01M 10/0525* (2013.01); *H01M 10/0569* (2013.01); *H01M 2300/0025* (2013.01)

(58) Field of Classification Search
None
See application file for complete search history.

(56) References Cited

U.S. PATENT DOCUMENTS

| 3,716,410 A | 2/1973 | Butler et al. |
| 2011/0114901 A1 | 5/2011 | Chung et al. |
| (Continued) | | |

FOREIGN PATENT DOCUMENTS

| CN | 106025355 A | 10/2016 |
| CN | 107001399 A | 8/2017 |
| (Continued) | | |

OTHER PUBLICATIONS

English language machine translation of Kajita et al. (JP 61-208758 A). (Year: 2022).*

(Continued)

*Primary Examiner* — Eli S Mekhlin
(74) *Attorney, Agent, or Firm* — Lerner, David, Littenberg, Krumholz & Mentlik, LLP (57) ABSTRACT

A non-aqueous electrolyte solution and a lithium secondary battery including the same are disclosed herein. In some embodiments, a non-aqueous electrolyte solution includes a lithium salt, an organic solvent, and a compound represented by Formula 1 as an additive. The compound has an excellent effect of removing a decomposition product, such as HF and $PF_5$, generated from the lithium salt in the electrolyte solution. The lithium secondary battery has improved high-temperature storage characteristics by including the non-aqueous electrolyte solution.

11 Claims, 3 Drawing Sheets

(56) References Cited

U.S. PATENT DOCUMENTS

| | | |
|---|---|---|
| 2012/0171576 A1 | 7/2012 | Tsai et al. |
| 2013/0252112 A1 | 9/2013 | Doe et al. |
| 2013/0273426 A1 | 10/2013 | Lim et al. |
| 2013/0337317 A1 | 12/2013 | Shima et al. |
| 2014/0272605 A1 | 9/2014 | Lim et al. |
| 2015/0140445 A1 | 5/2015 | Aoki et al. |
| 2016/0248121 A1 | 8/2016 | Uematsu et al. |
| 2016/0285130 A1 | 9/2016 | Meng et al. |
| 2017/0040649 A1* | 2/2017 | Schmitz ............ H01M 10/0565 |
| 2017/0267528 A1 | 9/2017 | Morinaka et al. |
| 2017/0365879 A1 | 12/2017 | Braeunling et al. |
| 2018/0006329 A1 | 1/2018 | Xiao et al. |

FOREIGN PATENT DOCUMENTS

| | | | | |
|---|---|---|---|---|
| CN | 107195970 A | | 9/2017 | |
| CN | 107507998 A | | 12/2017 | |
| CN | 107615556 A | | 1/2018 | |
| DE | 102015218653 A1 | | 3/2017 | |
| EP | 2828919 A2 | | 1/2015 | |
| JP | S5887779 A | | 5/1983 | |
| JP | 61208758 A | * | 9/1986 | ............ H01M 10/05 |
| JP | S61208758 A | | 9/1986 | |
| JP | H06030257 B2 | | 4/1994 | |
| JP | 2002093462 A | | 3/2002 | |
| JP | 20120142260 A | | 7/2012 | |
| JP | 2012190791 A | | 10/2012 | |
| JP | 2016173987 A | | 9/2016 | |
| KR | 20080047642 A | | 5/2008 | |
| KR | 20100006697 A | | 1/2010 | |
| KR | 20130116036 A | | 10/2013 | |
| KR | 20140073301 A | | 6/2014 | |
| KR | 20160097075 A | | 8/2016 | |
| KR | 101797320 B1 | | 11/2017 | |
| WO | 2015098471 A1 | | 7/2015 | |

OTHER PUBLICATIONS

Gueguen et al., J Electrochem. Soc. 2016, 163 A1095. (Year: 2016).*

Brunel, "Polysilanes: The grail for a highly-neglected hydrogen storage source," International Journal of Hydrogen Energy, Sep. 7, 2017, pp. 23004-23009, vol. 42, No. 36.

International Search Report for Application No. PCTKR2019001705 dated May 24, 2019, 2 pages.

Extended European Search Report including Written Opinion for Application No. EP19751925.9, dated Oct. 23, 2020, pp. 1-8.

* cited by examiner

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2019/001705, filed on Feb. 12, 2019, which claims priority from Korean Patent Application No. 10-2018-0016782, filed on Feb. 12, 2018, the disclosures of which are incorporated by reference herein.

TECHNICAL FIELD

The present invention relates to a non-aqueous electrolyte solution for a lithium secondary battery, which includes a non-aqueous electrolyte solution additive having an excellent effect of removing a decomposition product generated from a lithium salt, and a lithium secondary battery in which high-temperature storage characteristics are improved by including the same.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery. Among these secondary battery technologies, lithium ion batteries, which are battery systems having the theoretically highest energy density, are in the spotlight, and are currently being used in various devices.

Unlike the early days when lithium metal was directly applied to the system, the lithium ion battery is composed of a positive electrode formed of a transition metal oxide containing lithium, a negative electrode capable of storing lithium, an electrolyte solution, and a separator.

Among them, a significant amount of research on the electrolyte solution has been conducted while the electrolyte solution is known as a component that greatly affects stability and safety of the lithium ion battery.

The electrolyte solution for a lithium ion battery is composed of a lithium salt, an organic solvent dissolving the lithium salt, and a functional additive, wherein proper selection of these components is important to improve electrochemical properties of the battery. As a representative lithium salt currently used, $LiPF_6$, $LiBF_4$, LiFSI (lithium fluorosulfonyl imide, $LiN(SO_2F)_2$), LiTFSI (lithium bis(trifluoromethanesulfonyl imide), $LiN(SO_2CF_3)_2$), or LiBOB (lithium bis(oxalate) borate, $LiB(C_2O_4)_2$) is being used, and, with respect to the organic solvent, an ester-based organic solvent or ether-based organic solvent is being used.

With respect to the lithium ion battery, an increase in resistance and a decrease in capacity during charge and discharge or storage at high temperatures have been suggested as a serious problem in degradation of performance, and one of causes of the problem suggested is a side reaction caused by deterioration of the electrolyte solution at high temperatures, particularly deterioration due to decomposition of the salt at high temperatures. In a case in which a by-product of the salt is activated and then decomposes films formed on surfaces of the positive electrode and the negative electrode, there is a problem of decreasing passivation ability of the film, and, as a result, this may cause additional decomposition of the electrolyte solution and accompanying self-discharge.

Particularly, with respect to a negative electrode among electrode materials of the lithium ion battery, a graphite-based negative electrode is mostly used, wherein, with respect to graphite, since its operating potential is 0.3 V (vs. $Li/Li^+$) or less which is lower than an electrochemical stabilization window of an electrolyte solution used in the lithium ion battery, the currently used electrolyte solution is reduced and decomposed. The reduced and decomposed product transmits lithium ions, but forms a solid electrolyte interphase (SEI) that suppresses the additional decomposition of the electrolyte solution. However, in a case in which the SEI does not have sufficient passivation ability to such an extent that it may suppress the additional decomposition of the electrolyte solution, since the electrolyte solution is additionally decomposed during storage, the charged graphite is self-discharged, and as a result, a phenomenon occurs in which a potential of the entire battery is reduced.

One of factors that may affect the passivation ability is an acid, such as HF and $PF_5$, produced by pyrolysis of $LiPF_6$, a lithium salt widely used in the lithium ion battery. As the surface of the electrode deteriorates due to an acid attack, dissolution of transition metal occurs at the positive electrode to increase resistance, and capacity may be reduced by loss of redox centers. Since the metal ions thus dissolved are electrodeposited on the negative electrode, irreversible capacity is increased by consumption of electrons due to the electrodeposition of the metal and the additional decomposition of the electrolyte, and thus, cell capacity may not only be reduced, but also the resistance may be increased and the graphite negative electrode may be self-discharged.

Therefore, in order to maintain the passivation ability of the SEI at high temperatures, it may be an effective solution to introduce an electrolyte solution additive including double or triple bonds which may be reduction-decomposed well, or suppress the damage of the film by removing by-products generated due to heat/moisture, for example, decomposition products, such as HF and $PF_5$, generated from $LiPF_6$ as a lithium salt.

(Prior Art Document) Korean Patent Application Laid-open Publication No. 2013-0116036

DISCLOSURE OF THE INVENTION

Technical Problem

An aspect of the present invention provides a non-aqueous electrolyte solution for a lithium secondary battery which includes a non-aqueous electrolyte solution additive having an excellent effect of removing a decomposition product generated from a lithium salt which may be generated in the electrolyte solution.

Another aspect of the present invention provides a lithium secondary battery in which high-temperature storage characteristics are improved by including the non-aqueous electrolyte solution for a lithium secondary battery.

Technical Solution

According to an aspect of the present invention, there is provided a non-aqueous electrolyte solution for a lithium secondary battery including:

a lithium salt;
an organic solvent; and
a compound represented by the following Formula 1 as an additive.

[Formula 1]

In Formula 1,

$R_a$ to $R_c$ are each independently an unsubstituted or substituted alkylene group having 2 to 15 carbon atoms.

In Formula 1, $R_a$ to $R_c$ are each independently an unsubstituted or substituted alkylene group having 2 to 10 carbon atoms, and, specifically, $R_a$ to $R_c$ are each independently an unsubstituted or substituted alkylene group having 3 to 7 carbon atoms.

Specifically, in Formula 1, $R_a$ to $R_c$ may each independently include at least one selected from the group consisting of —$CR_1H$—$CR_2H$—$CR_3H$— (where $R_1$, $R_2$, and $R_3$ are each independently hydrogen or an alkyl group having 1 to 2 carbon atoms), —$CR_4H$—$CR_5H$—$CR_6H$—$CR_7H$— (where $R_4$, $R_5$, $R_6$, and $R_7$ are each independently hydrogen or an alkyl group having 1 to 2 carbon atoms), and —$CR_8H$—$CR_9H$—$CR_{10}H$—$CR_{11}H$—$CR_{12}H$— (where $R_8$, $R_9$, $R_{10}$, $R_{11}$, and $R_{12}$ are each independently hydrogen or an alkyl group having 1 to 2 carbon atoms).

More specifically, in Formula 1, $R_a$ to $R_c$ may each independently include at least one selected from the group consisting of —$CH_2$—$CH_2$—$CH_2$—, —$CH_2$—$CH_2$—$CH_2$—$CH_2$—, and —$CH_2$—$CH_2$—$CH_2$—$CH_2$—$CH_2$—.

More specifically, the compound represented by Formula 1 may include a compound represented by Formula 1a below.

[Formula 1a]

The compound represented by Formula 1 may be included in an amount of 0.1 wt % to 2.0 wt %, for example, 0.1 wt % to 1.7 wt % based on a total weight of the non-aqueous electrolyte solution.

Also, the non-aqueous electrolyte solution for a lithium secondary battery may further include at least one additional additive selected from the group consisting of a cyclic carbonate compound, a halogen-substituted carbonate compound, a sultone compound, a sulfate compound, a phosphate compound, a borate compound, a nitrile compound, a benzene compound, an amine compound, a silane compound, and a lithium salt compound.

According to another aspect of the present invention, there is provided a lithium secondary battery including the non-aqueous electrolyte solution for a lithium secondary battery of the present invention.

Advantageous Effects

In the present invention, a lithium secondary battery having improved initial discharge capacity and high-temperature storage characteristics may be prepared by providing a non-aqueous electrolyte solution for a lithium secondary battery which includes a Lewis base-based compound capable of scavenging a decomposition product, such as HF or $PF_5$, caused by anion decomposition of a lithium salt in the battery during charge and discharge.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

In a conventional lithium secondary battery, since films with passivation ability are formed on surfaces of a positive electrode and a negative electrode while a non-aqueous electrolyte solution is decomposed during initial charge and discharge, high-temperature storage characteristics may be significantly improved. However, such films may be degraded by an acid, such as HF and $PF_5$, produced by pyrolysis of $LiPF_6$, a lithium salt widely used in a lithium ion battery. Surface resistance of the electrode is increased due to a change in structure of the surface while dissolution of transition metal elements occurs at the positive electrode due to the acid attack, and capacity may be reduced because theoretical capacity is reduced while the metallic elements, as redox centers, are lost. Also, since the transition metal ions thus dissolved are electrodeposited on the negative electrode reacting in a strong reduction potential range, the transition metal ions not only consume electrons, but destruct the film when electrodeposited, and, accordingly, the surface of the negative electrode is exposed to cause an additional electrolyte decomposition reaction. As a result, there is a limitation in that capacity of a cell is continuously reduced while resistance of the negative electrode is increased and irreversible capacity is increased.

Thus, the present invention attempts to provide a non-aqueous electrolyte solution, which may prevent degradation of a solid electrolyte interphase (SEI) during high-temperature storage or dissolution of transition metal at the positive electrode by including a Lewis base-based additive, as a non-aqueous electrolyte solution additive, in a battery to remove an acid caused by the decomposition of a lithium salt, and a lithium secondary battery including the same.

Non-Aqueous Electrolyte Solution for Lithium Secondary Battery

Specifically, in an embodiment of the present invention, provided is a non-aqueous electrolyte solution for a lithium secondary battery including:

a lithium salt;

an organic solvent; and a compound represented by the following Formula 1 as an additive.

[Formula 1]

In Formula 1, $R_a$ to $R_c$ are each independently an unsubstituted or substituted alkylene group having 2 to 15 carbon atoms.

(1) Lithium Salt

First, in the non-aqueous electrolyte solution for a lithium secondary battery of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_2^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, LiBF$_4$, LiClO$_4$, LiBioClio, LiAlCl$_4$, LiAlO$_2$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiFSI (lithium bis(fluorosulfonyl)imide, LiN(SO$_2$F)$_2$), LiBETI (lithium bisperfluoroethanesulfonimide, LiN (SO$_2$CF$_2$CF$_3$)$_2$, and LiTFSI (lithium bis(trifluoromethanesulfonimide), LiN (SO$_2$CF$_3$)$_2$), or a mixture of two or more thereof. In addition to them, a lithium salt commonly used in an electrolyte solution of a lithium secondary battery may be used without limitation.

The lithium salt may be appropriately changed in a normally usable range but may be included in a concentration of 0.8 M to 4.0 M, for example, 1.0 M to 3.0 M in the electrolyte solution to obtain an optimum effect of forming a film for preventing corrosion of a surface of an electrode.

In a case in which the concentration of the lithium salt is less than 0.8 M, an effect of improving low-temperature output and cycle characteristics during high-temperature storage of the lithium secondary battery is insignificant, and, in a case in which the concentration of the lithium salt is greater than 4.0 M, electrolyte solution impregnability may be reduced due to an increase in viscosity of the non-aqueous electrolyte solution.

(2) Organic Solvent

Also, in the non-aqueous electrolyte solution for a lithium secondary battery, the organic solvent may include at least one organic solvent selected from the group consisting of a cyclic carbonate-based organic solvent, a linear carbonate-based organic solvent, a linear ester-based organic solvent, and a cyclic ester-based organic solvent.

Specifically, the organic solvent may include a cyclic carbonate-based organic solvent, a linear carbonate-based organic solvent, and a mixed organic solvent thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein, typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

Furthermore, the organic solvent may further include a linear ester-based organic solvent and/or a cyclic ester-based organic solvent in a mixed organic solvent of the cyclic carbonate-based organic solvent and the linear carbonate-based organic solvent to prepare an electrolyte solution having high ionic conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

The organic solvent may be used by adding an organic solvent typically used in an electrolyte solution for a lithium secondary battery without limitation, if necessary. For example, the organic solvent may further include at least one organic solvent selected from an ether-based organic solvent, an amide-based organic solvent, and a nitrile-based organic solvent.

(3) Additive

The non-aqueous electrolyte solution for a lithium secondary battery of the present invention may include a compound represented by the following Formula 1 as an additive.

[Formula 1]

In Formula 1,

$R_a$ to $R_c$ are each independently an unsubstituted or substituted alkylene group having 2 to 15 carbon atoms.

In this case, in Formula 1, $R_a$ to $R_c$ are each independently an unsubstituted or substituted alkylene group having 2 to 10 carbon atoms, and, specifically, $R_a$ to $R_c$ are each independently an unsubstituted or substituted alkylene group having 3 to 7 carbon atoms.

Specifically, in Formula 1, $R_a$ to $R_c$ may each independently include at least one selected from the group consisting of —$CR_1H$—$CR_2H$—$CR_3H$— (where $R_1$, $R_2$, and $R_3$ are each independently hydrogen or an alkyl group having 1 to 2 carbon atoms), —$CR_4H$—$CR_5H$—$CR_6H$—$CR_7H$— (where $R_4$, $R_5$, $R_6$, and $R_7$ are each independently hydrogen or an alkyl group having 1 to 2 carbon atoms), and —$CR_8H$—$CR_9H$—$CR_{10}H$—$CR_{11}H$—$CR_{12}H$— (where $R_8$, $R_9$, $R_{10}$, $R_{11}$, and $R_{12}$ are each independently hydrogen or an alkyl group having 1 to 2 carbon atoms).

More specifically, in Formula 1, $R_a$ to $R_c$ may each independently include at least one selected from the group consisting of —$CH_2$—$CH_2$—$CH_2$—, —$CH_2$—$CH_2$—$CH_2$—$CH_2$—, and —$CH_2$—$CH_2$—$CH_2$—$CH_2$—$CH_2$—.

More specifically, a representative example of the compound of Formula 1 may be a compound represented by Formula 1a below.

[Formula 1a]

The compound of Formula 1 may be included in an amount of 0.1 wt % to 2.0 wt %, particularly 0.1 wt % to 1.7 wt %, and more particularly 0.5 wt % to 1.5 wt % based on a total weight of the non-aqueous electrolyte solution.

In a case in which the additive is included in an amount within the above range, a secondary battery having more improved overall performance may be prepared. If the amount of the additive is less than 0.1 wt %, HF or $PF_5$ may be removed, but the removal effect may be insignificant over time, and, if the amount of the additive is greater than 2.0 wt %, resistance may be increased during high-temperature storage due to a side reaction caused by decomposition of the excessive amount of the additive.

Thus, in a case in which the additive is included in an amount of 0.1 wt % or more, particularly, 0.5 wt % or more, and is included in an amount of 2.0 wt % or less, particularly 1.7 wt % or less, and more particularly 1.5 wt % or less, the additive may more effectively remove the acid, such as HF and $PF_5$, as a decomposition product of the lithium salt while suppressing disadvantages such as a side reaction caused by the additive, capacity reduction, and resistance increase.

As described above, in the present invention, since a Lewis base-based compound containing a nitrogen element, such as the compound represented by Formula 1, is included as the electrolyte solution additive, a limitation, such as degradation of the SEI or dissolution of the transition metal at the positive electrode, may be addressed by removing a by-product which causes deterioration of the battery at high temperatures, for example, the acid which may be generated by the decomposition of the lithium salt.

For example, with respect to the compound represented by Formula 1, a P═O functional group acts as a Lewis base and reacts with a Lewis acid, such as HF or $PF_5$, which is a decomposition product produced by decomposition of an anion, to be able to scavenge the Lewis acid, and a tertiary nitrogen element, as a strong electron-donating group bonded to P, makes it possible to maintain capability as a Lewis base considerably strong. Thus, since the degradation behavior due to a chemical reaction of the films on the surface of the positive electrode or the negative electrode caused by the Lewis acid may be suppressed, it is possible to prevent the additional decomposition of the electrolyte solution of the battery due to the destruction of the film, and, furthermore, high-temperature storage characteristics may be improved by alleviating self-discharge of the secondary battery.

(4) Additional Additives

Furthermore, in order to prevent a non-aqueous electrolyte solution from being decomposed to cause collapse of the negative electrode in a high output environment, or further improve low-temperature high-rate discharge characteristics, high-temperature stability, overcharge protection, and an effect of suppressing battery swelling at high temperatures, the non-aqueous electrolyte solution for a lithium secondary battery of the present invention may further include additional additives in the non-aqueous electrolyte solution, if necessary.

As a representative example, the additional additive may include at least one additional additive selected from the group consisting of a cyclic carbonate compound, a halogen-substituted carbonate compound, a sultone compound, a sulfate compound, a phosphate compound, a borate compound, a nitrile compound, a benzene compound, an amine compound, a silane compound, and a lithium salt compound.

The cyclic carbonate compound may include vinylene carbonate (VC) or vinyl ethylene carbonate.

The halogen-substituted carbonate compound may include fluoroethylene carbonate (FEC).

The sultone compound may include at least one compound selected from the group consisting of 1,3-propane sultone (PS), 1,4-butane sultone, ethene sultone, 1,3-propene sultone (PRS), 1,4-butene sultone, and 1-methyl-1,3-propene sultone.

The sulfate compound may include ethylene sulfate (Esa), trimethylene sulfate (TMS), or methyl trimethylene sulfate (MTMS).

The phosphate compound may include at least one compound selected from the group consisting of lithium difluoro bis(oxalato)phosphate, lithium difluoro phosphate, tetramethyltrimethylsilyl phosphate, trimethylsilyl phosphite, tris(2,2,2-trifluoroethyl)phosphate, and tris(trifluoroethyl)phosphite.

The borate compound may include tetraphenyl borate and lithium oxalyldifluoroborate.

The nitrile compound may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene compound may include fluorobenzene, the amine compound may include triethanolamine or ethylenediamine, and the silane compound may include tetravinylsilane.

The lithium salt compound is a compound different from the lithium salt included in the non-aqueous electrolyte solution, wherein the lithium salt compound may include at least one compound selected from the group consisting of $LiPO_2F_2$, LiODFB, LiBOB (lithium bis(oxalato)borate (LiB$(C_2O_4)_2$), and $LiBF_4$.

In a case in which, among these additional additives, vinylene carbonate, vinyl ethylene carbonate, or succinonitrile is included, a more robust SEI may be formed on the surface of the negative electrode during an initial activation process of the secondary battery.

In a case in which $LiBF_4$ is included, the high-temperature stability of the secondary battery may be improved by suppressing generation of gas which may be generated due to the decomposition of the electrolyte solution at high temperatures.

Two or more of the additional additives may be mixed and used, and the additional additives may be included in an amount of 0.01 wt % to 50 wt %, particularly 0.01 wt % to 10 wt %, and preferably 0.05 wt % to 5 wt % based on the total weight of the non-aqueous electrolyte solution. In a case in which the amount of the additional additives is less than 0.01 wt %, an effect of improving low-temperature output, high-temperature storage characteristics, and high-temperature life characteristics is insignificant, and, in a case in which the amount of the additional additives is greater than 50 wt %, a side reaction in the electrolyte solution may excessively occur during charge and discharge of the battery. Particularly, if the excessive amount of the additives for forming an SEI is added, the additives for forming an SEI may not be sufficiently decomposed at high temperatures so that the additives may be present in the form of an unreacted material or precipitates in the electrolyte solution at room temperature. Accordingly, a side reaction may occur in which lifetime or resistance characteristics of the secondary battery are degraded.

Lithium Secondary Battery

Also, in another embodiment of the present invention, there is provided a lithium secondary battery including the non-aqueous electrolyte solution for a lithium secondary battery of the present invention.

After an electrode assembly, in which a positive electrode, a negative electrode, and a separator disposed between the positive electrode and the negative electrode are sequentially stacked, is formed and accommodated in a battery case, the lithium secondary battery of the present invention may be prepared by injecting the non-aqueous electrolyte solution of the present invention.

The lithium secondary battery of the present invention may be prepared according to a conventional method known in the art and used, and the method of preparing the lithium secondary battery of the present invention is specifically as described below.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_{Z1}O_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_p Co_q Mn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or two or more compounds thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement effect due to the control of types and content ratios of components constituting the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt %, for example, 90 wt % to 99 wt %, based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene copolymer, a styrene-butadiene rubber, a fluoro rubber, various copolymers, and the like.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be undoped and doped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3(0 \leq x \leq 1)$, $Li_xWO_2$ $(0 \leq x \leq 1)$, and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ $(0 < x \leq 2)$, a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene copolymer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 65 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Non-Aqueous Electrolyte Solution for Lithium Secondary Battery)

A non-aqueous electrolyte solution for a lithium secondary battery was prepared by adding 1 g of the compound represented by Formula 1a to 99 g of a non-aqueous organic solvent (ethylene carbonate (EC):ethyl methyl carbonate (EMC)=volume ratio of 3:7) in which 1.2 M $LiPF_6$ was dissolved.

(Coin-Type Half Cell Preparation)

A positive electrode active material (lithium-nickel-cobalt-manganese oxide, $Li(Ni_{0.8}Co_{0.1}Mn_{0.1})O_2$), a conductive agent (carbon black), and a binder (polyvinylidene fluoride) were added to N-methyl-2-pyrrolidone (NMP) at a weight ratio of 97.5:1:1.5 to prepare a positive electrode slurry (solid content of 60 wt %). A 15 μm thick positive electrode collector (Al thin film) was coated with the positive electrode slurry, dried, and roll-pressed to prepare a positive electrode.

After a porous polypropylene separator was disposed between the positive electrode and a Li metal negative electrode in a dry room, the above-prepared non-aqueous electrolyte solution was injected to prepare a coin-type half cell.

Example 2

A non-aqueous electrolyte solution and a coin-type half cell including the same were prepared in the same manner as in Example 1 except that 1.5 g of the compound represented by Formula 1a was added to 98.5 g of the non-aqueous organic solvent during the preparation of the non-aqueous electrolyte solution.

Example 3

A non-aqueous electrolyte solution and a coin-type half cell including the same were prepared in the same manner as in Example 1 except that 2 g of the compound represented by Formula 1a was added to 98 g of the non-aqueous organic solvent during the preparation of the non-aqueous electrolyte solution.

Example 4

(Preparation of Non-Aqueous Electrolyte Solution for Lithium Secondary Battery)

A non-aqueous electrolyte solution for a lithium secondary battery was prepared by adding 0.5 g of the compound represented by Formula 1a, 0.1 g of tetravinylsilane, 1.0 g of lithium difluorophosphate, 1.0 g of ethylene sulfate, 0.5 g of 1,3-propane sultone, 0.2 g of $LiBF_4$, and 6.0 g of fluorobenzene to 90.7 g of an organic solvent (ethylene carbonate:ethyl methyl carbonate=volume ratio of 3:7) in which 0.7 M $LiPF_6$ and 0.3 M LiFSI were dissolved.

(Electrode Assembly Preparation)

A positive electrode active material ($Li(Ni_{0.8}Co_{0.1}Mn_{0.1})O_2$; NCM), a conductive agent (carbon black), and a binder (polyvinylidene fluoride) were added to N-methyl-2-pyrrolidone (NMP) at a weight ratio of 97.5:1:1.5 to prepare a positive electrode slurry (solid content: 50 wt %). A 12 μm thick aluminum (Al) thin film, as a positive electrode collector, was coated with the positive electrode slurry, dried, and roll-pressed to prepare a positive electrode.

A negative electrode active material (SiO:graphite=weight ratio of 5:95), a binder (SBR-CMC), and a conductive agent (carbon black) were added to water, as a solvent, at a weight ratio of 95:3.5:1.5 to prepare a negative electrode mixture slurry (solid content: 60 wt %). A 6 μm thick copper (Cu) thin film, as a negative electrode collector, was coated with the negative electrode mixture slurry, dried, and roll-pressed to prepare a negative electrode.

The positive electrode, a porous polyolefin-based separator coated with inorganic particles ($Al_2O_3$), and the negative electrode were sequentially stacked to prepare an electrode assembly.

(Secondary Battery Preparation)

The above-assembled electrode assembly was accommodated in a pouch type battery case, and the non-aqueous electrolyte solution for a lithium secondary battery was injected thereinto to prepare a pouch type lithium secondary battery.

Comparative Example 1

(Preparation of Non-aqueous Electrolyte Solution for Lithium Secondary Battery)

A non-aqueous electrolyte solution was prepared by dissolving $LiPF_6$ to have a concentration of 1.2 M in a non-aqueous organic solvent (ethylene carbonate (EC):ethyl methyl carbonate (EMC)=volume ratio of 3:7).

(Coin-Type Half Cell Preparation)

A coin-type half cell was prepared in the same manner as in Example 1 except that the above-prepared non-aqueous electrolyte solution was used instead of the non-aqueous electrolyte solution of Example 1.

Comparative Example 2

(Preparation of Non-aqueous Electrolyte Solution for Lithium Secondary Battery)

A non-aqueous electrolyte solution for a lithium secondary battery was prepared by adding 0.1 g of tetravinylsilane, 1.0 g of lithium difluorophosphate, 1.0 g of ethylene sulfate, 0.5 g of 1,3-propane sultone, 0.2 g of $LiBF_4$, and 6.0 g of fluorobenzene to 91.2 g of an organic solvent (ethylene carbonate:ethyl methyl carbonate=volume ratio of 3:7) in which 0.7 M $LiPF_6$ and 0.3 M LiFSI were dissolved.

(Secondary Battery Preparation)

A pouch type lithium secondary battery was prepared in the same manner as in Example 4 except that the above-prepared non-aqueous electrolyte solution was used instead of the non-aqueous electrolyte solution of Example 4.

EXPERIMENTAL EXAMPLES

Experimental Example 1

6 of each of the coin-type half cells of Examples 1 to 3 prepared in dry room and the coin-type half cells of Comparative Example 1 prepared in dry room were put in a 25° C. thermostat for 24 hours and then charged and discharged at a constant current-constant voltage (CC—CV) of 0.1 C in a voltage range of 3.00 V to 4.25 V (vs. Li/Li$^+$). In this case, a current termination condition of CV was set to 0.05 C. The above charging and discharging were set as one cycle, and 5 cycles of charging and discharging were performed.

Figure 1:
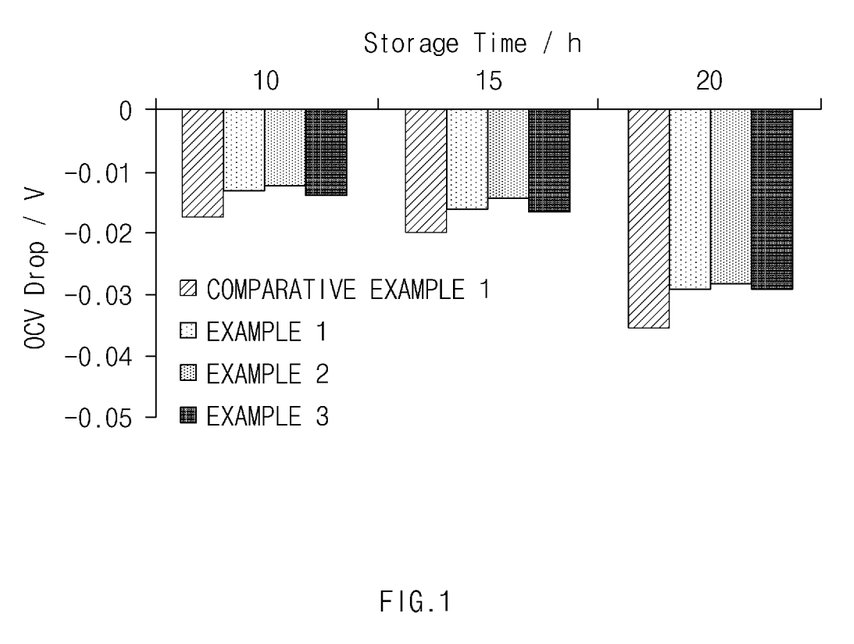
FIG. 1 is a graph illustrating a degree of change in open-circuit voltage (OCV) of cells according to high-temperature storage time in Experimental Example 1 of the present invention.

After the 5 cycles of charging and discharging were performed, the coin-type half cells were charged at 4.25 V at room temperature under the same conditions, changes in OCV (open-circuit voltage) were then measured every 10 hours, 15 hours, and 20 hours while the coin-type half cells were put in a 60° C. high-temperature chamber, and the results thereof are presented in FIG. 1.

Referring to FIG. 1, with respect to the coin-type half cells prepared in Examples 1 to 3, a decrease in OCV was not large, at less than −0.03 V even after 20 hours after the high-temperature storage, but, with respect to the coin-type half cell of Comparative Example 1 which included the non-aqueous electrolyte solution without an additive, it may be understood that a decrease in OCV was large after 20 hours after the high-temperature storage.

That is, in a case in which the change in OCV was large as in Comparative Example 1, it denoted that self-discharge of the positive electrode was severe and capacity was degraded. In contrast, since the coin-type half cells of Examples 1 to 3 had a small decrease in OCV, it may be understood that self-discharge of the battery was alleviated.

With respect to the coin-type half cell of Example 3 which included the non-aqueous electrolyte solution containing 2 wt % of the additive in comparison to the coin-type half cells of Examples 1 and 2, the decrease in OCV was smaller than that of the coin-type half cell of Comparative Example 1, but it may be understood that the decrease in OCV was relatively larger than those of the secondary batteries of Examples 1 and 2 because resistance of the electrode was increased while an amount of the additive decomposed was increased.

Experimental Example 2. High-Temperature Storage Characteristics Evaluation

After each of the secondary batteries prepared in Example 4 and Comparative Example 2 was activated at a CC of 0.1 C, degas was performed. Subsequently, each secondary battery was charged at a CC of 0.33 C to 4.20 V under a constant current-constant voltage (CC—CV) condition at 25° C., then subjected to 0.05 C current cut-off, and discharged at a CC of 0.33 C to 2.5 V. The above charging and discharging were set as one cycle, and 3 cycles were performed.

Subsequently, initial discharge capacity was measured using PNE-0506 charge/discharge equipment (manufacturer: PNE SOLUTION Co., Ltd., 5 V, 6 A), a state of charge (SOC) was adjusted to 50%, and a pulse of 2.5 C was then applied for 10 seconds to calculate initial resistance through a difference between a voltage before the pulse application and a voltage after the pulse application.

Next, each secondary battery was recharged at a CC of 0.33 C to a SOC of 100% and then stored at a high temperature of 60° C. for 4 weeks. In this case, CC—CV charge and discharge were performed at a CC of 0.33 C every two weeks after the high-temperature storage, and discharge capacity after high-temperature storage was then measured using PNE-0506 charge/discharge equipment (manufacturer: PNE SOLUTION Co., Ltd., 5 V, 6 A).

Figure 2:
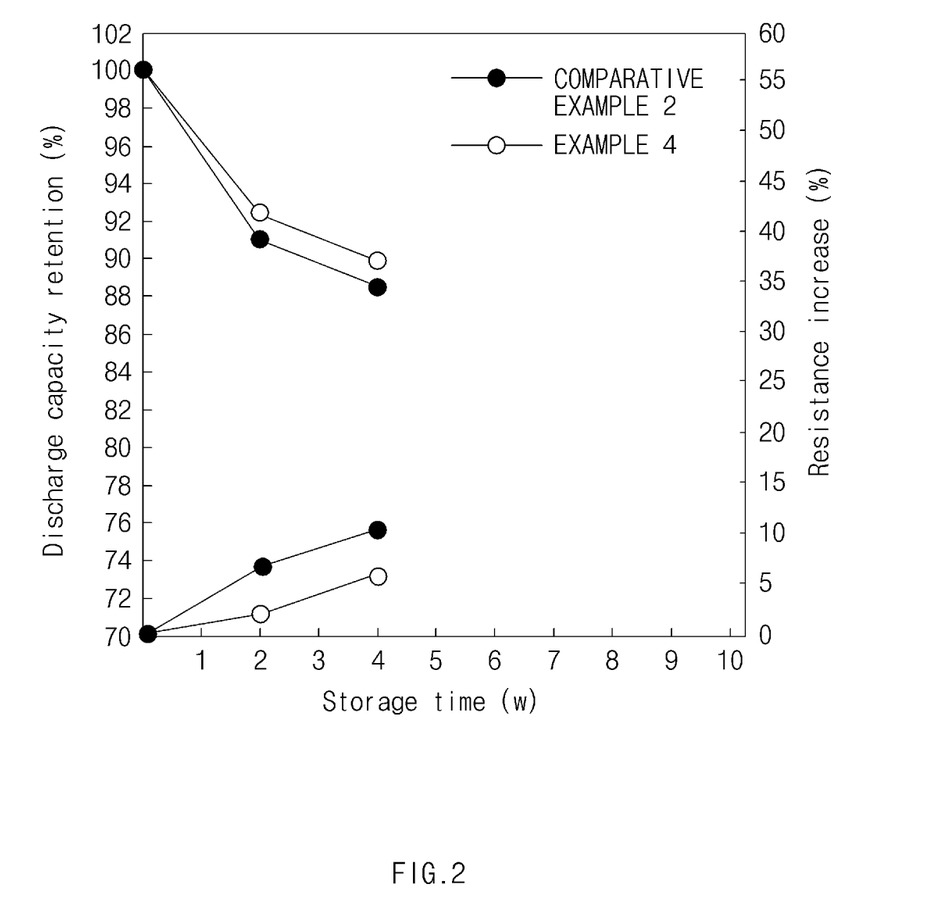
FIG. 2 is a graph illustrating the results of discharge capacity retention and resistance increase rate evaluation according to lithium secondary battery storage time of Experimental Example 2 of the present invention.

The measured initial discharge capacity and the discharge capacity after high-temperature storage measured every two weeks were substituted into the following Equation (1) to calculate discharge capacity retention after high-temperature storage, and the results thereof are presented in FIG. 2.

In this case, after measuring discharge capacity every two weeks after the high-temperature storage, resistance was calculated every two weeks after the high-temperature storage through a voltage drop obtained in a state in which each of the secondary batteries was subjected to a discharge pulse at 2.5 C for 10 seconds at a SOC of 50%, the resistance was substituted into the following Equation (2) to calculate a resistance increase rate (%), and the results thereof are presented in FIG. 2. In this case, the voltage drop was calculated using PNE-0506 charge/discharge equipment (manufacturer: PNE SOLUTION Co., Ltd., 5 V, 6 A).

$$\text{Discharge capacity retention (\%)} = (\text{discharge capacity every two weeks after high-temperature storage}/\text{initial discharge capacity}) \times 100 \quad \text{Equation (1):}$$

$$\text{Resistance increase rate (\%)} = \{(\text{resistance every two weeks after high-temperature storage} - \text{initial resistance})/\text{initial resistance}\} \times 100 \quad \text{Equation (2):}$$

Referring to FIG. 2, with respect to the secondary battery of Example 4 which included the non-aqueous electrolyte solution containing the non-aqueous electrolyte solution additive of the present invention, it may be confirmed that discharge capacity retention (%) and resistance increase rate (%) were significantly improved after two weeks after the high-temperature storage in comparison to those of the secondary battery of Comparative Example 2.

That is, with respect to the secondary battery including the non-aqueous electrolyte solution of Example 4 of the present invention, since the non-aqueous electrolyte solution included the additive capable of removing a lithium salt by-product (HF/$PF_5$) which was formed by the decomposition of the lithium salt ($LiPF_6$) included in the non-aqueous electrolyte solution, it may be considered that the dissolution of the transition metal at the positive electrode and the degradation of the SEI on the surface of the negative electrode, which occurred by the lithium salt by-product, are suppressed in comparison to the secondary battery including the non-aqueous electrolyte solution of Comparative Example 2.

Experimental Example 3. Cycle Characteristics Evaluation

After formation process of each the lithium secondary batteries prepared in Example 4 and Comparative Example 2 was performed at a CC of 0.1 C, degas was performed.

Subsequently, each secondary battery was charged at a CC of 0.33 C to 4.20 V under a constant current-constant voltage (CC—CV) condition at 25° C., then subjected to 0.05 C current cut-off, and discharged at a CC of 0.33 C to 2.5 V. The above charging and discharging were set as one cycle, and 3 cycles were performed.

Subsequently, initial discharge capacity was measured using PNE-0506 charge/discharge equipment (manufacturer: PNE SOLUTION Co., Ltd., 5 V, 6 A).

Next, each secondary battery was charged at a CC of 0.33 C to 4.20 V under a constant current-constant voltage (CC—CV) condition at 45° C., then subjected to 0.05 C current cut-off, and discharged at a CC of 0.33 C to 2.50 V. The above charging and discharging were set as one cycle, and 50 cycles of charging and discharging were performed. Discharge capacity after 50 cycles at 45° C. was measured using PNE-0506 charge/discharge equipment (manufacturer: PNE SOLUTION Co., Ltd., 5 V, 6 A).

Discharge capacity retention (%) after 50 cycles at a high temperature was calculated by using the following Equation (3), and the results thereof are presented in FIG. 3 below.

Figure 3:
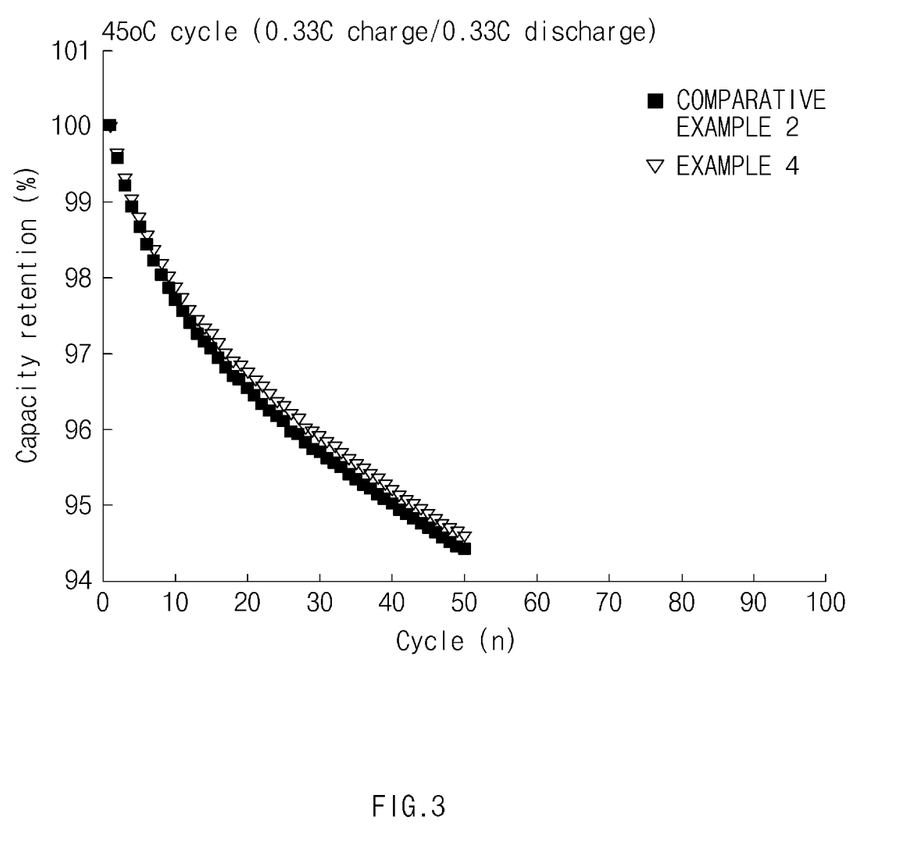
FIG. 3 is a graph illustrating discharge capacity retentions according to cycles of lithium secondary batteries of Experimental Example 3 of the present invention.

Discharge capacity retention (%) after 50 cycles= (discharge capacity after 50 cycles/initial discharge capacity)×100   Equation (3):

Referring to FIG. 3, with respect to the lithium secondary battery of Example 4 including the non-aqueous electrolyte solution of the present invention, since an irreversible loss of lithium due to the destruction of the SEI was reduced even after 50 cycles at a high temperature, it may be understood that the discharge capacity retention of the battery was improved in comparison to that of the lithium secondary battery of Comparative Example 2.

The invention claimed is:

1. A non-aqueous electrolyte solution for a lithium secondary battery, the non-aqueous electrolyte solution comprising:
 a lithium salt;
 an organic solvent; and
 a compound represented by Formula 1 as an additive:

[Formula 1]

wherein, in Formula 1,
$R_a$ to $R_c$ are each independently an unsubstituted or substituted alkylene group having 3 to 15 carbon atoms.

2. The non-aqueous electrolyte solution for a lithium secondary battery of claim 1, wherein, in Formula 1, $R_a$ to $R_c$ are each independently an unsubstituted or substituted alkylene group having 3 to 10 carbon atoms.

3. The non-aqueous electrolyte solution for a lithium secondary battery of claim 1, wherein, in Formula 1, $R_a$ to $R_c$ are each independently an unsubstituted or substituted alkylene group having 3 to 7 carbon atoms.

4. The non-aqueous electrolyte solution for a lithium secondary battery of claim 1, wherein, in Formula 1, $R_a$ to $R_c$ each independently comprise at least one selected from the group consisting of —$CR_1H$—$CR_2H$—$CR_3H$—, —$CR_4H$—$CR_5H$—$CR_6H$—$CR_7H$—, and —$CR_8H$—$CR_9H$—$CR_{10}H$—$CR_{11}H$—$CR_{12}H$—, where $R_1$ to $R_{12}$ are each independently hydrogen or an alkyl group having 1 to 2 carbon atoms.

5. The non-aqueous electrolyte solution for a lithium secondary battery of claim 1, wherein, in Formula 1, $R_a$ to $R_c$ each independently comprise at least one selected from the group consisting of —$CH_2$—$CH_2$—$CH_2$—, —$CH_2$—$CH_2$—$CH_2$—$CH_2$—, and —$CH_2$—$CH_2$—$CH_2$—$CH_2$—$CH_2$—.

6. The non-aqueous electrolyte solution for a lithium secondary battery of claim 1, wherein the compound of Formula 1 comprises a compound represented by Formula 1a:

[Formula 1a]

7. The non-aqueous electrolyte solution for a lithium secondary battery of claim 1, wherein the compound represented by Formula 1 is included in an amount of 0.1 wt % to 2.0 wt % based on a total weight of the non-aqueous electrolyte solution.

8. The non-aqueous electrolyte solution for a lithium secondary battery of claim 7, wherein the compound represented by Formula 1 is included in an amount of 0.1 wt % to 1.7 wt % based on the total weight of the non-aqueous electrolyte solution.

9. The non-aqueous electrolyte solution for a lithium secondary battery of claim 1, further comprising at least one additional additive selected from the group consisting of a cyclic carbonate compound, a halogen-substituted carbonate compound, a sultone compound, a sulfate compound, a phosphate compound, a borate compound, a nitrile compound, a benzene compound, an amine compound, a silane compound, and a lithium salt compound.

10. A lithium secondary battery comprising the non-aqueous electrolyte solution for a lithium secondary battery of claim 1.

11. The non-aqueous electrolyte solution for a lithium secondary battery of claim 1, wherein the organic solvent includes a cyclic carbonate-based organic solvent, a linear carbonate-based organic solvent, or a mixture thereof.

* * * * *